United States Patent Office

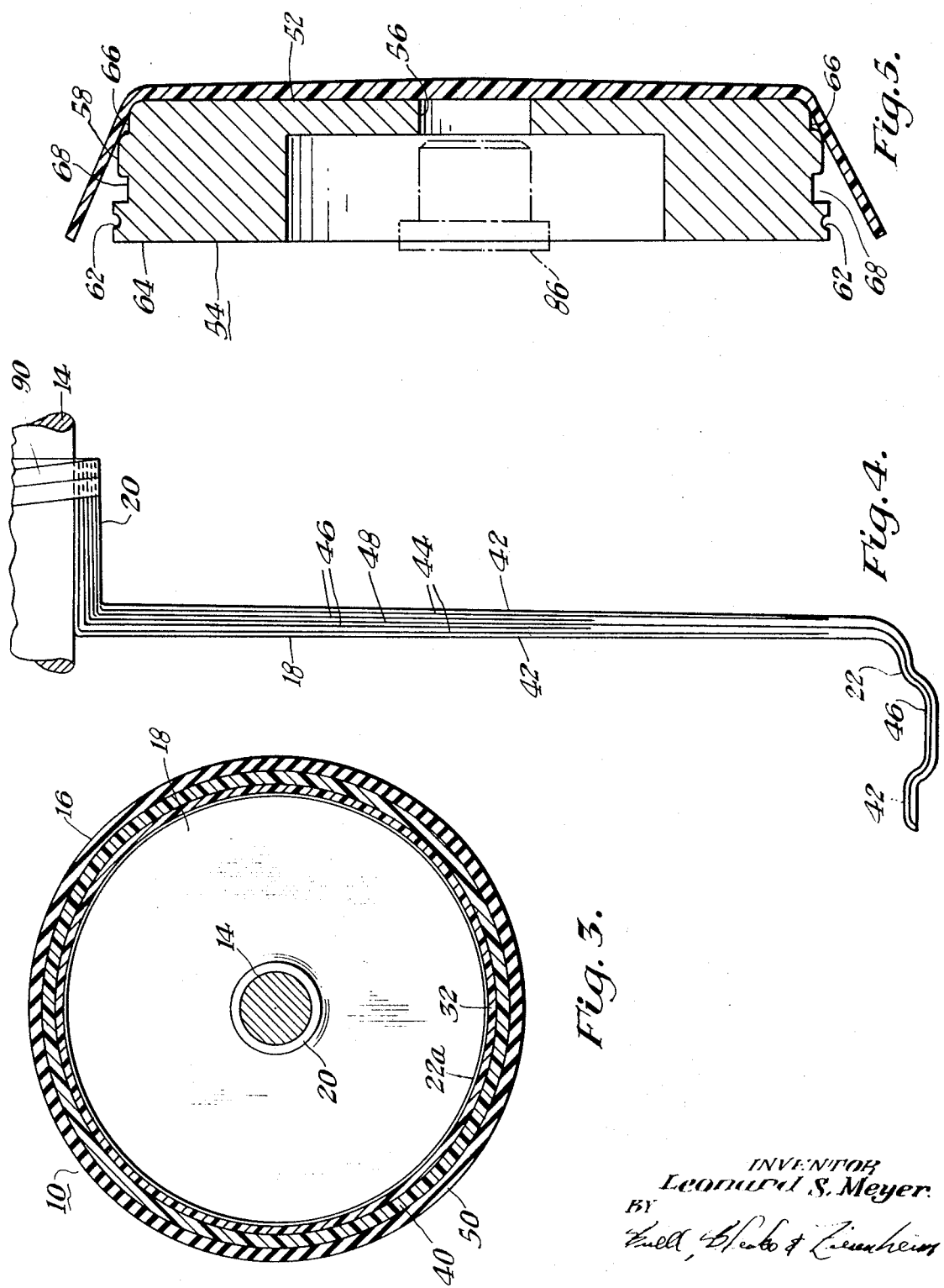

3,613,200
Patented Oct. 19, 1971

3,613,200
REINFORCED PLASTIC SHELL STRUCTURES AND METHODS AND MEANS FOR CONSTRUCTING THE SAME
Leonard S. Meyer, Columbia, S.C., assignor to McCreary Industrial Products Company, Inc., Indiana, Pa.
Filed Oct. 29, 1968, Ser. No. 771,407
Int. Cl. B21b *31/08*
U.S. Cl. 29—132                                     16 Claims

ABSTRACT OF THE DISCLOSURE

I disclose a reinforced plastic shell structure mountable upon a shaft or the like, said structure including a pair of spaced end discs fabricated from laminated layers of plastic and reinforcing material, each of said discs having a rim structure and a hub, at least some of said reinforcing layers extending at least partially into said rim and said hub, and a reinforced plastic shell section extending between said rims and adhered thereto.

---

The present invention relates to reinforced, hollow plastic shell structures and more particularly to a laminated assemblage of such shells including methods and means for fabricating the same.

The structures provided by my invention are particularly useful in corrosive and/or abrasive environments. The reinforced plastic structures of my invention are adaptable for use in a wide range of varying environmental conditions, typified for example by extreme abrasive conditions, elevated temperatures or severe chemically corrosive conditions involving high or low pH environments.

My invention finds extensive applications in various types of chemical processing equipment, such as tanks, ducts, conveyors, weirs, for handling alkalis, acids, and other corrosive materials, which may in addition contain abrasive matter or otherwise involve erosive flow velocities. The structural features of my invention, for example, can be applied in the manufacture of fan blades and shafts for ventilating equipment used in exhausting hot acid tanks or similar processing equipment. The shell or casing constructions of my invention, in short, can be substituted for a large number of applications heretofore requiring the use of metal or alloy structural materials and difficult-to-apply linings or coatings of corrosion- and erosion-resistant materials.

One of such applications is the manufacture of the shell structures for various types of rolls employed in certain steel fabricating and other processes where the rolls are exposed to extremely corrosive environments. In such applications the shell structures of my invention can be formed from or coated with one of the various corrosive and abrasive resistant facing materials described and claimed in a co-pending co-assigned application of Robert S. McGaughey, entitled "Process for Making Abrasion and Corrosion-Resistant Composite Structural Materials and the Like," filed Oct. 29, 1965, Ser. No. 505,621, now Pat. 3,520,747 issued July 14, 1970.

Although many attempts have been made to protect conventional structural materials (usually steel or steel alloys) of the aforementioned and other process equipment from various types of corrosive environments, expedients such as glass, plastic and rubber coatings have largely proven to be unsatisfactory after relatively short periods of service. The aforementioned co-pending application has provided coatings or linings which have extended considerably the periods of service or life of the aforementioned equipment even under the most severe corrosive and abrasive conditions. However, it has been found that leaks eventually develop in such coatings and linings as a result of abuse of the equipment or from long periods of usage. When exposed to strong mineral acids or other highly corrosive materials, such leaks cause the eventual destruction of the metallic substrates on which the aforementioned coatings are deposited. In the types of corrosive environments contemplated by the invention, even minute leaks are intolerable as even the more corrosion resistant structural metals such as the stainless steels are quickly destroyed.

In this application, the invention is described primarily in connection with the construction of shells for the aforementioned rolls although it will be abundantly clear as this description proceeds that my novel structural means is readily adaptable for use in other types of equipment such as mentioned above or illustrated in the aforementioned co-pending application.

In steel processing applications, for example in handling steel strip and the like, large numbers of the aforementioned rolls are utilized for guiding, tensioning and otherwise engaging the strip during rolling and pickling operations. In the latter processing category, the rolls are subjected to a number of strong pickling agents and other corrosive compounds employed in pickling or cleaning or otherwise treating the steel strip for various applications. The highly corrosive cleaning agents are unavoidably carried to and coated on the various rolls as the strip is moved thereover or therebetween in its process along the rolling mill, pickling line or the like.

In the past, the roll body has been fabricated from a structural material such as carbon steel which is usually hollow in many applications as noted below. In order to protect the rolls from attack by the aforementioned cleaning or pickling agents, such as hydrochloric, sulfuric, and hydrofluoric acids, and sometimes a mixture of these it has been the usual practice to provide an acid-resistant covering for the roll, such as neoprene, acid-resistant rubber or other elastomeric material. The rubber covering also affords increased frictional engagement between the roll and the strip or other work material. Various types of acid resistant coatings or layers may be adhered to the metallic substrate and in turn coated with the aforementioned neoprene or other elastomeric material. The applications of various protective and corrosive resistant materials to the metallic substrate last for long or short periods depending on the coverings having been applied in accordance with the aforementioned co-pending application or in accordance with prior disclosures such as typified by the patents to Freelander 2,597,858; Francis 2,614,058; Rockoff 2,804,678; Roscoe 2,925,088; Landes 2,961,362 and Marshall 2,989,966.

Eventually, however, a break may occur in the acid resistant layers of the roll face which permits access of acid to the steel core of the roll. The hollow steel core is then eaten away by the acid and is consequently damaged beyond repair usually before the damage is discovered owing to the fact that small ruptures in the outer, resilient coatings are not readily apparent. Although the outer resilient covering can be removed and replaced as required, usually however, restoration of the strip handling rolls in this manner is not undertaken as long as such minor ruptures are not apparent and the resilient covering is performing its function of proper frictional engagement with the steel strip or the like.

In many steel processing applications and in other uses of rolls including many applications where a pair of the rolls are employed in pinch relationship, hollow steel cores are utilized where the rolls are not subjected to extreme forces. The use of hollow rolls reduces the weight and difficulty of fabrication. In the past the application of a laminated protective structure to the roll shell has permitted the thickness of the steel shell to be minimized.

My invention further reduces the weight and complexity of the roll shell or other reinforced structure and at the same time increases corrosion resistance of the structure by replacing the conventional steel shell, with a novel, reinforced plastic structure. The shell structure afforded by my invention can be further reinforced by the application of one or more of the reinforced corrosion and abrasion resistant structures described and claimed in the aforementioned pending application or with a laminated structure forming part of the present invention. The shell structure of my invention can serve as a substrate for the application of the long-lived corrosion- and abrasion-resistant structure of the aforesaid copending application, or my novel shell structure can include the roll face structures disclosed herein, depending upon the specific application of my novel reinforced shell structure.

My invention also contemplates a unique, draw type mold structure and methods useful in forming components of the aforementioned shell structure. These are adapted particularly for forming and shaping reinforced resin or other plastic structures, in which the reinforcement is employed in discreet shapes or layers such as cloth or mat. Means and methods are also provided to facilitate handling of the laminate structure, to lubricate the drawing components of the mold structure, to facilitate parting of the structure from the mold laminate, to provide smooth outer surfaces on the laminate structure particularly on those which do not physically contact the mold, and to facilitate compaction of the laminate structure and the removal of air bubbles therefrom. Such means are capable of yielding in all directions to permit drawing of the laminate structure during the molding operation.

I accomplish these desirable results and overcome the deficiencies of the prior art by providing a reinforced plastic shell structure mountable upon a shaft or the like, said structure including a pair of spaced end discs fabricated from laminated layers of plastic and reinforcing material, each of said discs having a rim structure and a hub, at least some of said reinforcing layers extending at least partially into said rim and said hub, and a reinforced plastic shell section extending between said rims and adhered thereto.

I also desirably provide a similar structure wherein a continuous reinforced plastic facing layer is adhered to said shell section and to adjacent surfaces of said rims.

I also desirably provide a similar structure wherein a pair of said discs are mounted in hub-to-hub relationship and a resin impregnated reinforcing tape is wrapped about said hubs to secure said hubs and said discs together.

I also desirably provide a similar structure wherein additional discs and shell sections are employed and the rims of at least an intermediate one of said discs is provided with a pair of off-set portions for seating adjacent shell sections.

I also desirably provide a similar structure wherein additional discs and shell sections are provided, said shell sections being mounted with their edges in lateral abutting relationship to form junctions overlying said disc rims respectively.

I also desirably provide a supporting disc for a laminated reinforced plastic shell structure, said disc comprising a plate portion having a central opening, rim and hub sections affixed respectively to the outer and inner peripheries of said plate, said disc including a number of plastic impregnated laminations, at least some of said laminations extending at least partially into said rim and said hub sections.

I also desirably provide a similar disc wherein said plate section is tapered and is formed by generally concentric larger and smaller diameter laminations.

I also desirably provide a similar disc wherein said laminations are provided with lanced tabs at said central opening, said tabs being extended axially of said central opening and into said hub section.

I also desirably provide a mold structure for fabricating a supporting disc and the like, said mold structure comprising a base member having a surface substantially defining a plate portion of said disc, a rim surface, means for shaping said disc about said rim surface, said base section having a central opening therein juxtaposed to a hub section of said disc, and a plug member closely insertable through said opening for shaping said hub section.

I also desirably provide a method for fabricating and shaping a laminate structure, said method comprising the steps of concentrically disposing a number of generally circular layers of reinforcing material impregnated with a suitable resin, shaping the outer peripheral portions of some of said layers to form a rim section, lancing a plurality of tabs from each of said layers adjacent the common center thereof, extending and shaping said lanced tabs at least partially to form a hub section, and curing said resin to adhere said layers one to the other.

I also desirably provide a method for fabricating and shaping a laminate structure, said method comprising the steps of arranging in a predetermined array a number of layers of reinforcing material impregnated with a suitable resin, applying a layer of lubricating and shaping material to at least one of the outermost layers of said array, applying shaping forces to said film for lubricated engagement with said layers for the purposes of drawing and shaping said array and for stretching said film over the adjacent one of said layers for smoothing the same.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein:

FIG. 2A is a partial longitudinally sectioned view of another form of the shell construction arranged in accordance with the invention;

FIG. 3 is a cross sectional view of the apparatus as shown in FIG. 1 and taken along reference line III—III of FIG. 2;

FIG. 4 is a partial enlarged sectional view of one of the rib or disc structures employed in fabricating the shell of FIG. 1;

FIG. 5 is a partially exploded view of one form of mold arrangement for forming the shell ribs or discs;

FIG. 6 is a similar view of the mold arrangement as shown in FIG. 5 but illustrating an additional part of the mold structure and a further step in fabricating the shell disc and hub; and FIG. 6A is a partial elevational view of the roll structure as shown in FIG. 5.

Figure 1:
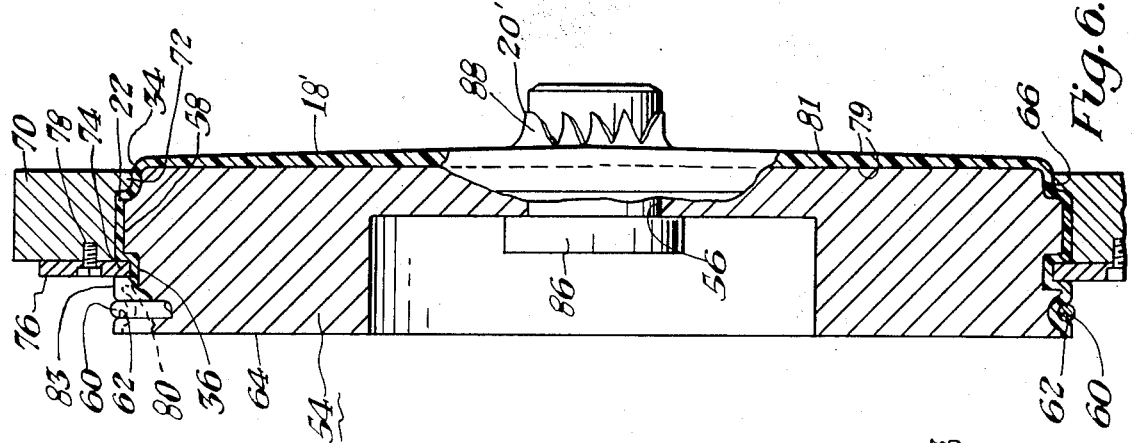
FIG. 1 is an isometric view, partially broken away, of one form of shell construction arranged in accordance with the invention.

Referring now more particularly to FIGS. 1–4 of the drawings, the reinforced plastic structure of the invention is arranged exemplarily as a hollow shell construction 10 forming part of a corrosion and abrasive resistant roll 12. In this example of the invention, then, the roll 12 includes a supporting shaft 14 on which are spacedly mounted a pair of end ribs or discs 16. Each of the discs 16 includes a plate section 18, a hub 20 and a supporting rim 22. A number of intermediate supporting discs or ribs 24, of similar construction can be mounted in a spaced array along the roll shaft 14 and between the end discs 16. The intermediate supporting discs 24 are substantially similar in construction to that of the end discs 16. In this arrangement of the invention four such intermediate discs 24 are employed although it will be readily understood that a greater or lesser number can be utilized.

In the illustrated arrangement each pair of adjacent supporting discs, including the end discs 16 are mounted with their hubs 20 in apposed spaced relationship to facilitate the application of a number of wrappings of reinforced plastic tape 26. The tape 26, as described in greater detail below, aids in reinforcing the hubs 20 and in securing the associated discs to the roll shaft 14. For the latter purpose a space 28 desirably is left between each pair of apposed hubs 20. The tape 26 is a narrow strip fiber glass cloth impregnated with a curable plastic such as epoxy or polyester resin.

Figure 2:
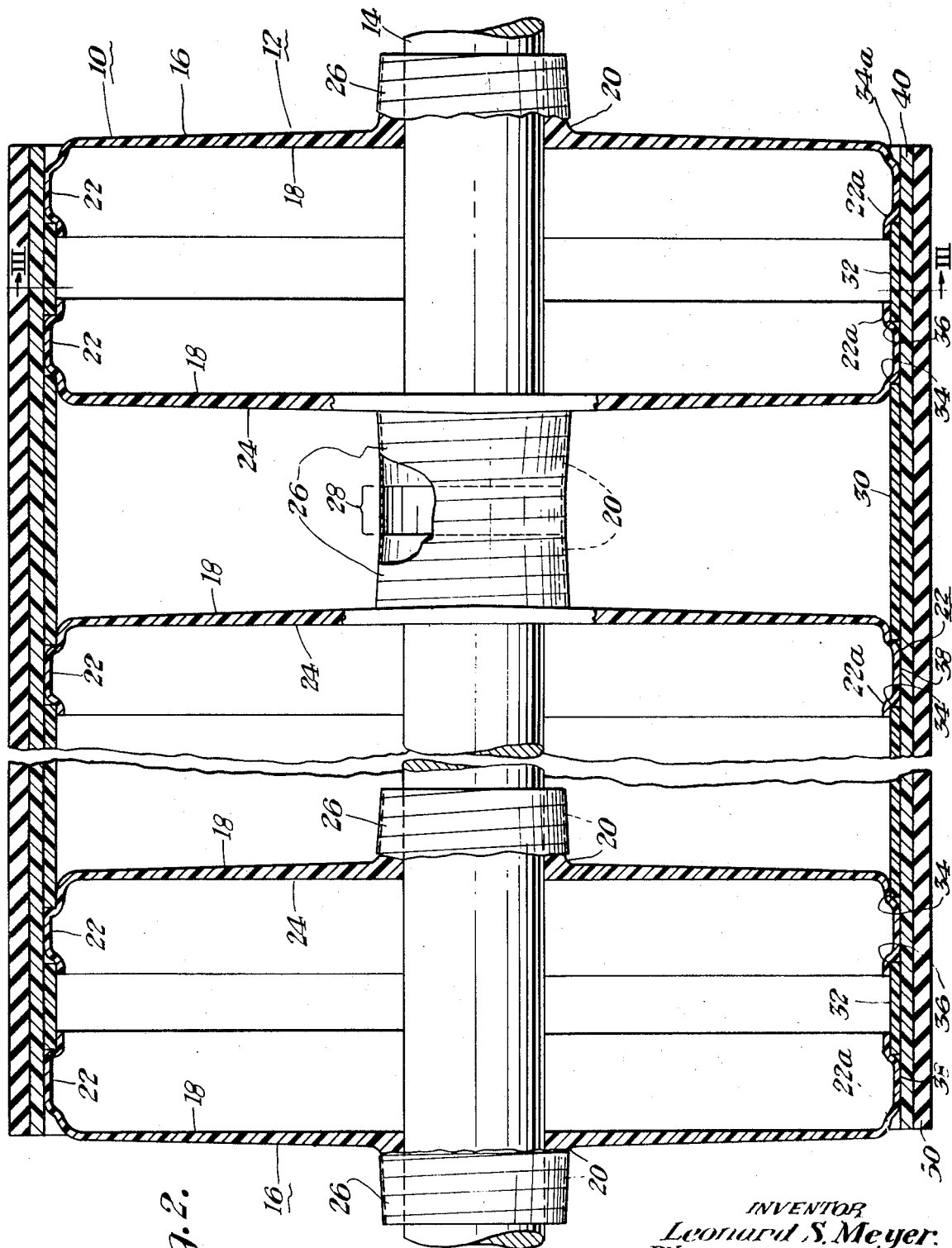
FIG. 2 is a longitudinally sectioned view of the apparatus as shown in FIG. 1 and taken along reference line II—II thereof.

As better shown in FIG. 2 the supporting discs 16 and 24 are positioned along the length of the roll shaft 14 so that access spaces initially are left between their respective rims 22 to permit application of the reinforcing tape 26.

Following the application of the reinforced tape 26 these access spaces are closed by relatively short shell sections 30, 32, which in this example are of differing lengths depending upon the relative distances between each pair of adjacent rims 22. In this arrangement the longer shell sections 30 are seated in a first shouldered or off-set portion 34 of adjacent rims 22, while the shorter sections 32 are seated in additional off-set or shouldered portions 36 on each rim 22. It will be understood that the first mentioned off-set 34 can be omitted from each rim of the end discs 16 if desired. Usually, however, the off-sets 34 are included for uniformity in manufacturing procedures.

In assembling the shell sections 30, 32 upon the rims 22, 22a, these segments can be provided in the form of pre-shaped split rings or cylinders for preliminary expansion over the larger diameter portions 38 of the rims. Alternatively, a predimensioned flat strip of reinforced plastic laminate can be bent or formed in situ about the rims. The shell sections can be secured to the associated rims 22 and 22a with a suitable adhesive or by heating or solvent welding. The ends of the ring, if split, can be rejoined by similar procedures or by applying additional laminations to the shell structure. Alternatively a thin and inexpensive temporary support can be utilized initially in place of the shell sections 30, 32 and these sections can then be built up or laminated upon the temporary support until their thicknesses are equivalent to the diametric differences between the offsets 34, 36 and the rim projections 38. Such temporary supports for example can be fabricated in the form of a split ring of sheet steel or other structural material. The temporary supports, however, have no other function in the laminated plastic shell once the shell segments 30, 32 are built up to their requisite thickness.

After the shell sections 30, 32 are thus assembled, a continuous layer 40 of the laminated plastic is applied to the entire roll face defined by the outer surfaces of the sections 30, 32 and the rim projections 38. The layer 40, supporting discs 16, 24 and the shell sections 30, 32 desirably are constructed from similar plastic and reinforcing materials. In this example, one of the known polyester or epoxy resins can be employed in conjunction with a number of layers of reinforcing material such as fiber glass. The various components of the shell structure 10 are laminated by the application of successive layers of reinforcing fiber and resin or other suitable plastic until the requisite thicknesses of the various components is attained. Desirably layers of plastic impregnated reinforcing material are applied and subsequently cured to form a rigid mass of considerable strength. Other examples of resins and reinforcing materials suitable for the layers 40 are disclosed in the aforementioned McGaughey patent. The reinforcing layer 40 and shell sections 30, 32 can be formed with adequate strength for a great variety of severe structural loads.

Alternatively, the intermediate rim projections 38 can be omitted as better shown in FIG. 2A such that the rims 22' have a smooth outer cylindrical surface. In this form of the shell structure the cylindrical segments 30', 32' are correspondingly lengthened so that the lateral edges abut, as better shown in FIG. 2A, at their junctions with the associated rims 22'. The structure of FIG. 2A likewise can be covered with a continuously laminated facing layer 40'.

In the supporting discs 16 or 24 the plate sections 18 desirably are tapered from the associated hubs 20 to the rims 22 as better shown in FIG. 4 of the drawings. This arrangement affords the required columnar and beam strength for compressive and bending forces while minimizing the requisite quantity of reinforced resin. Tapering of the discs 16 or 20 in this manner can be accomplished by the use of larger and smaller diameter laminations such as the laminations 42, 44, 46 and 48 as shown in FIG. 4, together with the associated layers of polyester resin or other suitable structural and curable plastic material. Desirably, the largest diameter layers 42 are disposed at the outer surfaces of the discs 16 or 24 in order to provide a smooth outer surface contour.

As shown in FIG. 4 parts of the laminations 42–48 are extended at least partially into the hub area 20 of the disc so that the hub 20 becomes an integral part of the supporting disc 16 or 24. The structure and method of making the hub 20 will be further described in connection with FIG. 5 of the drawings.

In a somewhat similar manner some but not all of the laminations for example the layers 42 and 46 are extended into the rim areas 22 of the discs 16, 24 as likewise shown in FIG. 4. When laminating the discs 16 or 24, as with the mold structure illustrated in FIGS. 5 and 6, the rims 22 are shaped to afford the off-set areas 34, 36 and the intermediate circumferential rim projections 38.

A number of laminated or reinforced plastic materials can be employed in place of the aforementioned polyester resin and fiber glass depending upon the application of the invention and the type of corrosive environments that may be encountered. For example, where the roll 12 is employed in a pickling line or the like utilizing hydrofluoric acid (HF) the use of fiber glass reinforcement is not desirable as it is attacked by this acid. In such cases a polyester, phenolic, or epoxy resin can be employed in a laminated structure reinforced with layers of Dynel cloth (polyvinyl copolymer) or with a mineral fiber such as crocidolite. Other combinations of structural plastic and reinforcing materials can be utilized, such as those set forth in the aforementioned co-pending application. Useful methods of application and lamination are disclosed in the co-pending application.

After the facing layer 40 or 40' has been built up or laminated to the required thickness, a resilient facing material 50, such as neoprene or other elastomeric material can be applied to the continuously reinforced plastic layer 40 or 40'. The resilient layer 50 can be adhered to the reinforced plastic layer 40 or 40' by means of one of the methods set forth in the aforementioned co-pending application.

Referring now to FIGS. 5 and 6 of the drawings, exemplary means and methods for fabricating the supporting discs 16 or 24 are illustrated. In the arrangement shown a number of the disc laminations such as the layers 42–48 are applied to mold structure 54 as better shown in FIG. 5. The laminations 42–48 initially are circular and are not provided with a hub opening. The circular laminations are desirably applied in a concentric manner to front surface 52 of the mold structure 54. Moreover, the circular laminations are centered with respect to central opening 56 of the mold structure. The peripheral portions of the larger diameter laminations 42 and 46 of FIG. 4 extend generally over the rim surfaces 58 of the mold structure 54. The laminated structure thus far described, including the layers 42–48, is preliminarily retained on and stretched over the mold structure 54 by means of garter spring 60 which retains the larger diameter laminations at groove 62 of mold flange 64.

Desirably, the layers 42–48 are applied with the largest layers, such as 42 adjacent the outer surfaces of the disc. To facilitate arranging the laminae or layers 42–48 these may be provided in pairs of circular sheets or sections, with the exception of the central layer 46. The smaller diameter discs 88 desirably are interleaved with larger diameter discs to produce a balanced and gently tapering structure of considerable strength.

The rim surfaces 58 of the mold structure 54 include recessed areas 66, 68 by which the mold structure 54 including clamping or draw ring 70 is employed to shape the rim sections 22 or 22a of the discs 16 or 24. Before the laminations 42–48 (FIG. 5) have cured and while they are still pliable the draw ring 70 (FIG. 6) is slipped over the disc structure and the rim surfaces 58, as better shown in FIG. 6. The draw ring 70 is provided with a first, stationary flange 72, which extends inwardly to form the rim off-set 34 or 34a. The draw ring 70 includes also a second inwardly extending flange structure 74 for forming the second rim off-set 36. The flange structure 74 can be fabricated from ring segments 76 mounted on the draw ring 70 for example by means of a bolt and slot denoted generally at 78.

Desirably, as better shown in FIG. 6, the draw ring 70 and its inwardly extending flange means 74 are formed with such axial thicknesses that the operating position of the draw ring is defined by the juxtaposition of its flange means 74 and the adjacent surface 81 of the mold structure flange 64, when the peripheral portion 83 of the disc is inserted therebetween.

As better shown in FIG. 6, I apply molding and drawing facilitating means to the side surfaces of the discs 18'. By way of example such means include co-extensive films 79 of polyvinyl alcohol or the like, which also facilitate handling of the green or uncured laminate structure 18'. More specifically the films 79 aid in parting the laminate 18' from the mold structure after curing. When the draw ring 70 engages the laminate structure 18' the films 79 afford lubrication for shaping the off-sets at 66, 68. When the off-set at 66 is formed by the draw ring 70, this action stretches the outer film 79 over the adjacent outer surfaces 81 of the laminate 18' to smooth the surfaces 81 without the use of a complicated two-part mold structure. In addition to its lubricating function the outer film 79 also prevents the draw ring from snagging the adjacent cloth or mat layer 42.

Prior to operation of the draw ring 70, air bubbles which are usually unavoidably entrapped in and between the resin and reinforcement layers can be removed from the structure 18' with a squeegee (not shown) or the like operated from the hub of the disc 18' toward the outer periphery of the laminant 18'. The transparency of the polyvinyl alcohol films 79 (or equivalent) facilitates air bubble removal in this manner. Finally, after curing, the parting films 79 facilitate disengagement of the draw ring 70 from the laminate structure 18' and removal of the structure 18' from the balance of the mold 54, as noted below.

Although the layers 79 have been designated as films, it will be understood that similar materials having thicknesses in the sheet category can be substituted depending upon the application of the invention.

After the disc has been thus shaped and cured the unwanted outer periphery thereof can be severed as denoted by reference character 80. At this time the shaped disc can be removed by flexing its rim portion 22 over the projecting surfaces of the roll rim 58. Alternatively, the body structure 82 of the mold 54 can be segmented (not shown) to facilitate removal of the rim 22.

Prior to removal of the disc from the mold structure 54 and prior to curing thereof, the hub section 20' of the disc is formed as better shown in FIGS. 5, 6 and 6A of the drawings. After the laminations 42–48 have been placed in the front surfaces 52 of the mold structure 54 and retained by garter spring 60 or other banding means, the laminations are slit or otherwise provided with a series of cuts 84 (FIG. 6A) which cuts terminate at the edges of the central mold structure opening 56. A plug 86 is then inserted from the other side of the mold structure 54 through the aperture 56 to bend the slit portions or lanced tabs 88 of the laminations outwardly as shown in FIG. 6 of the drawings. The lanced tabs 88 are thus extended axially to form a base structure for the hub 20' (FIG. 6). The hub 20' is then built up to its required thickness and strength (FIG. 4) by the application of wrappings 90 of a suitable reinforced tape such as fiberglass impregnated with an uncured resin. The resin impregnating the lanced tabs 88 and the tape 90 is then cured to form a rigid laminated structure 20' of considerable strength and substantially integral connection to the plate portion 18 of the discs 16 or 24. Instead of a fiberglass reinforcement, the tape 90 can be fabricated from other resins and reinforcing materials as noted hereinabove and in the aforementioned co-pending application.

After formation of the disc plate areas (FIG. 5) the rim areas (FIG. 6) and the hub section (FIGS. 6A and 6) the disc after curing in a proper and known manner is removed from the mold structure 54. Pairs of the discs 16 or 24 are then assembled desirably in hub-to-hub relation as shown in FIG. 2, and additional wrappings 26 of the tape 90 can be applied to the hubs 20 to secure the adjacent hubs to one another or to the roll shaft 14. After separation of the disc from the draw mold 54, the films 79 can be completely or partially removed as desired.

In view of the foregoing it will be apparent that novel reinforced plastic structures have been disclosed herein, together with novel means and methods for assembling the structures and for fabricating comopnent parts thereof. While I have shown and described certain presently preferred embodiments of the invention and have illustrated certain presently preferred methods of practicing the same, it is to be distinctly understood that the invention is not limited thereto but may be variously embodied and practiced within the scope of the following claims.

I claim:

1. A reinforced plastic shell structure mounted upon a shaft or the like, said structure including a pair of spaced end discs fabricated from laminated layers of plastic and reinforcing material, each of said discs having a rim structure and a hub by which said discs are mounted on said shaft, at least some of said reinforcing layers etxending at least partially into said rim and said hub, and a reinforced plastic shell section extending between said rims and adhered thereto.

2. The combination according to claim 1 wherein each of said rims is provided with off-set means for seating said shell section therein.

3. The combination according to claim 2 wherein a continuous reinforced plastic facing layer is adhered to said shell section and to adjacent surfaces of said rims.

4. The combination according to claim 1 wherein each of said discs is tapered from its hub to its rim for enhanced columnar and beam strength.

5. The combination according to claim 4 wherein the tapered portions of said discs are provided by larger and smaller diameter laminations.

6. The combination according to claim 5 wherein said larger and smaller diameter laminations are disposed in an alternating array with larger diameter laminations being disposed at the outer surfaces of said disc.

7. The combination according to claim 5 wherein said larger and smaller diameter laminations are mounted concentrically in each of said discs and portions thereof are slit at a central opening of said disc and extended axially thereof into said hub.

8. A supporting disc for a laminated reinforced plastic shell structure, said disc comprising a plate portion having a central opening, rim and hub sections affixed respectively to the outer and inner peripheries of said plate, said disc including a number of plastic impregnated laminations, at least some of said laminations extending at least partially into said rim and said hub sections.

9. The combination according to claim 8 wherein said plate section is tapered and is formed by generally concentric larger and smaller diameter laminations.

10. The combination according to claim 9 wherein at least some of said laminations are provided with lanced tabs at said central opening, said tabs being extended axially of said central opening and into said hub section.

11. The combination according to claim 10 wherein said hub section is secured to a shaft by a number of wrappings of plastic impregnated tape adhered to said lanced tabs.

12. The combination according to claim 1 wherein a pair of said discs are mounted in hub-to-hub relationship and a resin impregnated reinforcing tape is wrapped about said hubs to secure said hubs and said discs together.

13. The combination according to claim 12 wherein said hubs are spaced along said shaft and said tape is applied additionally to said shaft at the area between said hubs to secure said hubs also to said shaft.

14. The combination according to claim 1 wherein additional discs and shell sections are employed and the rims of at least an intermediate one of said discs is provided with a pair of off-set portions for seating adjacent shell sections.

15. The combination according to claim 1 wherein additional discs and shell sections are provided, said shell sections being mounted with their edges in lateral abutting relationship to form junctions overlying said disc rims respectively.

16. The combination according to claim 15 wherein a continuous reinforced plastic facing layer is applied continuously to the outer surface of said shell sections.

References Cited

UNITED STATES PATENTS

| | | | |
|---|---|---|---|
| 1,543,382 | 6/1925 | Harris | 29—132 X |
| 1,582,453 | 4/1926 | Dustan | 29—132 UX |
| 2,925,088 | 2/1960 | Roscoe | 29—132 X |
| 3,042,995 | 7/1962 | Birkin | 29—132 X |
| 3,213,517 | 10/1965 | Brown | 29—132 X |

ALFRED R. GUEST, Primary Examiner